Patented May 12, 1942

2,282,797

UNITED STATES PATENT OFFICE 2,282,797

MANUFACTURE OF CEREAL GERM OIL

Sidney Musher, New York, N. Y., assignor to Musher Foundation Incorporated, New York, N. Y., a corporation of New York No Drawing. Application December 22, 1939, Serial No. 310,555

12 Claims. (Cl. 260—412.4)

This invention relates to the production of wheat germ oil.

In accordance with this invention, a finely milled oily paste is prepared by grinding or finely macerating a sufficient quantity of glyceride oil, preferably cod liver or other fish oil, with the wheat germ, and then expressing in a plate press to remove the cod liver oil-wheat germ oil combination which contains substantially all the wheat germ oil contained in the wheat germ, leaving behind a wheat germ residue in which the wheat germ oil has been replaced by cod liver oil, for example, and which residue is valuable for feeding purposes.

In accordance with this invention, the wheat germ is ground to a finely milled, oily paste using 1½ parts by weight of cod liver oil to 1 part by weight of wheat germ, the paste being perfectly smooth. The grinding is preferably conducted between stone rollers, the rollers moving either in opposite directions or at different speeds whereby a fine maceration and breakdown of the wheat germ cells are obtained. The mixture may also be put through a colloid mill in order to break into the individual cells of the wheat germ and permit the wheat germ oil to be released and replaced by the added oil.

The time of grinding may vary from about 15 seconds upwards although generally a grinding period of about 30 seconds is sufficient thoroughly to break through the cell structure of the germ.

The paste thus obtained is desirably not subjected to a screw type expression for the paste is not readily held in the grinding chamber. Instead, the paste is placed in a pot type press whereby a tight fitting piston operating under great pressure expresses the oil from the paste without the paste exuding from the sides of the press. Thus the paste is expressed in batches.

The oil thus obtained contains substantially all of the oil of the wheat germ, and the glyceride oil-wheat germ oil combination thus obtained shows no objectionable odor of the wheat germ, is free of sarcoma producing substances and may desirably be used as a high vitamin containing oil for pharmaceutical purposes, for fortifying other oils, preferably glyceride oils, or other foods, and particularly for addition to animal feeds such as in preparing complete poultry feeds.

The oil used for forming into a paste with the wheat germ is desirably a glyceride oil of fish origin, such as cod liver oil, halibut liver oil, tuna fish liver oil, shark liver oil, herring oil, mackerel oil, salmon oil, or menhaden oil. Other glyceride oils which may also be utilized are the animal and vegetable oils and fats, in crude, refined or hydrogenated condition, such as olive oil, cottonseed oil, sesame oil, peanut oil, soya bean oil, corn oil, and lard.

Where desired, ordinary wheat germ oil in crude or refined condition may also be utilized as the glyceride oil for grinding with additional wheat germ.

For example, wheat germ may be solvent extracted by the use of hexane, and the wheat germ oil thus obtained may, with or without refining, be ground with equal parts by weight of wheat germ to an oily pasty condition and then expressed.

In addition to using the unexpressed or unextracted wheat germ for grinding with an oil, the wheat germ residue or cake obtained following ordinary expeller expression may also be utilized for grinding into a paste with a glyceride oil and then expressing in the manner above mentioned. There is then removed from the wheat germ residue the balance of the wheat germ oil remaining in the residue after the previous expression or extraction.

Although the proportion of 1½ parts of cod liver oil to every 1 part of wheat germ by weight is specifically called for and is the desirable proportion to use in order to produce the most desirable wheat germ oil-cod liver oil combination, other proportions may be employed varying from 1 part to about 2½ parts by weight of the glyceride oil to every 1 part of the wheat germ.

The oily viscous paste before expression desirably contains over about 35% total solids and preferably 45% or more total solids.

It is undesirable to use larger proportions of the glyceride oil because the wheat germ oil is then diluted in too large a quantity of the added glyceride oil.

Where desired, the wheat germ may, before grinding, be allowed to soak for a period of from 15 minutes to 12 hours in an equal amount by weight of the glyceride oil in order to soften the cellular structure of the wheat germ and enable the paste to be formed more readily.

The residue which is obtained after the paste is expressed by means of the pot type press is desirably subjected to a second expression in a screw type expeller to remove an additional quantity of the wheat germ and added oil combination and in order to obtain a greater yield. Although the paste cannot be handled by the ordinary screw type expeller, after the paste has been expressed by means of the special piston type expeller, the residue may then be handled by the ordinary screw type expeller.

Other cereal germs including rice germs, corn germs, oat germs and rye germs may similarly be utilized for grinding with cod liver oil or other glyceride oil.

The glyceride oil made up of the combination of the wheat germ oil and the added oil used for grinding with the wheat germ is extremely stable to oxidative deterioration and the antioxidant properties of the wheat germ oil are considerably enhanced as a result of extraction from the wheat germ by the process of this invention when compared with the ordinary cold pressed wheat germ oil. Not only is the added oil such as the cod liver oil used for preparation into a paste with the wheat germ substantially stabilized against deterioration, but the stabilizing effect is considerably enhanced over the ordinary wheat germ oil removed by ordinary methods and the combined wheat germ oil-glyceride oil combination may be used for blending or mixing with other glyceride oils to stabilize such other oils against deterioration.

Although a glyceride oil is more particularly called for under this invention, there may much less preferably be utilized refined white mineral oil for admixture with the wheat germs or these other germs to form a paste and for subsequent expression of the paste as indicated above.

The germs may, where desired, be obtained from cereals which have been subjected or the germs may otherwise have been subjected to a sprouting or germinating process before grinding with the oil. For example, wheat may be allowed to germinate by soaking in water until the wheat has absorbed about half of its weight of water, and then allowed to sprout. The dried germs may then be removed and prepared as an oily paste in accordance with this invention.

The cereals before the germs are removed and preferably the germs are desirably puffed by subjecting to a high temperature under pressure and then suddenly released by the use of puffing "guns." For example, the germs, containing a small quantity of moisture, may be subjected to a pressure of 80 pounds per square inch for 20 seconds, at a temperature of about 500° F., and then released to form the "puffed" germs. The puffed germs are readily ground to a macerated, oily paste and then expressed in accordance with this invention.

Particularly where, during the grinding and macerating operation, the paste is subjected to an elevated temperature of in excess of 200° F. and desirably to about 250° F. or more, the oil obtained by expression of the paste is substantially stabilized against oxidative deterioration.

Having described my invention, what I claim is:

1. A method of extracting an oil from a cereal germ, which comprises grinding said cereal germ in low moisture condition with an oil selected from the group consisting of the glyceride oils and mineral oil to form an oily viscous paste containing in excess of about 35% total solids until the oil has been extracted from said cereal germ and then expressing the oil from the solids whereby there is produced a high quality and highly stable oil.

2. A method of extracting an oil from wheat germ, which comprises grinding said wheat germ in low moisture condition with a glyceride oil to form an oily viscous paste until the oil has been extracted from said wheat germ and then expressing the oil from the solids whereby there is produced a high quality and highly stable glyceride oil.

3. A method of extracting an oil from wheat germ, which comprises grinding said wheat germ in low moisture condition with cod liver oil to form an oily viscous paste containing in excess of about 35% total solids until the oil has been extracted from said wheat germ and then expressing the oil from the solids whereby there is produced a high quality and highly stable glyceride oil.

4. A highly stabilized glyceride oil carrying the oil soluble constituents of a finely divided oily paste of a low moisture containing cereal germ, extracted after prolonged grinding of the glyceride oil with the cereal germ, said paste containing in excess of about 35% total solids.

5. A process of obtaining a wheat germ residue in which the wheat germ oil has been replaced by cod liver oil which comprises grinding the wheat germ to a finely milled oily paste with cod liver oil, and then crushing the paste to remove the oil therefrom.

6. A process of removing substantially all of the wheat germ oil from wheat germ which comprises grinding about 1 part by weight of wheat germ with about 1½ parts by weight of cod liver oil to form a finely milled oily paste, continuing said grinding for a period varying from about 15 to 30 seconds, and expressing the resultant paste to obtain a mixed oil which carries substantially all of the wheat germ oil of the wheat germ.

7. A process of treating wheat germ which comprises grinding low moisture containing wheat germ with a glyceride oil at a temperature of above at least 200° F. to form a paste and then expressing the paste to remove the oil therefrom.

8. A method of extracting an oil from a cereal germ, which comprises grinding said cereal germ in low moisture condition at a temperature of above at least 200° F. with an oil selected from the group consisting of the glyceride oils and mineral oil to form an oily viscous paste containing in excess of about 35% total solids until the oil has been extracted from the solids, whereby there is produced a high quality and highly stable oil.

9. A method of extracting an oil from a cereal germ, which comprises grinding said cereal germ in low moisture condition at a temperature of above at least 200° F. with a glyceride oil to form an oily viscous paste containing in excess of about 35% total solids until the oil has been extracted from the solids, whereby there is produced a high quality and highly stable oil.

10. A highly stabilized glyceride oil carrying the oil soluble constituents of a finely divided oily paste of a low moisture containing wheat germ, extracted after prolonged grinding of the glyceride oil with the wheat germ, said paste containing in excess of about 35% total solids.

11. A highly stabilized fish oil carrying the oil soluble constituents of a finely divided oily paste of a low moisture containing cereal germ, extracted after prolonged grinding of the fish oil with the cereal germ, said paste containing in excess of about 35% total solids.

12. A highly stabilized fish oil carrying the oil soluble constituents of a finely divided oily paste of a low moisture containing wheat germ, extracted after prolonged grinding of the fish oil with the wheat germ, said paste containing in excess of about 35% total solids.

SIDNEY MUSHER.